UNITED STATES PATENT OFFICE.

FRANCIS WHITELEY, OF STANARDSVILLE, VIRGINIA.

COMPASSES, QUADRANT, AND PROTRACTOR.

Specification of Letters Patent No. 99, dated December 6, 1836.

*To all whom it may concern:*

Be it known that I, FRANCIS WHITELEY, of Stanardsville, in the county of Orange and State of Virginia, have invented a new and Improved Instrument for the Purpose of Surveying, Engineering, &c., and do hereby declare the following is a full and exact description, it being called "Whiteley's Mathematical Instrument."

It is formed with two rules, or scales, and a quadrant, or quarter circle attached to one rule, and a back pointer to the other. The quadrant has the degrees marked on it from 0 to ninety, and by opening the rules which are fastened at the center by a screw, the back pointer will mark the degrees on the quadrant. There is a long, square, or oblong box which is fastened to either of the rules by a screw containing a magnetical needle which may be readily changed from one rule to the other when using the instrument as a compass; in running the southwest or northeast courses, the box containing the magnetical needle must be on the left hand rule, or that attached to the quadrant, and in running the southeast and northwest courses the compass box must be on the other rule. Now by setting the back pointer to the course called for, and move the instrument till the needles settle north and south you have your course. The staff used is such as is generally used by surveyors, with the exception that there is a notch in the socket so that the ball may be turned down at right angles from the perpendicular so that the compass will be changed to a quadrant. The lower rule being leveled by the plumb or spirit-level, and by elevating, or depressing the upper scale until it cut the object the quadrant will mark the degrees of elevation, or depression. There are two sets of sights, one set on each rule. The method of using the said instrument to guard against local attraction is thus performed; run the first course with the magnetical needle, and if no local attraction is found on that line the survey may be made without using the magnetical needle, by setting the instrument to the angle called for, and setting one set of sights to range with the line you have run; the other set will mark the course of the other line which you must run by back, and foresights so govern the line you have to run by the line preceding it till the whole survey is completed. The same instrument may be used as a protractor in the following manner: Set the back pointer to the angle called for, and lay one rule to the meridian line, and slide that rule up, or down the meridian line till you cut your last station, and you have your course, and so proceed from station to station till your plat is completed.

I claim as my invention—

The manner of constructing this instrument with double sights upon two rules, or scales as herein described, furnished with a box containing a compass needle constructed in the manner, and adapted thereby to the purposes herein set forth, and I also claim the manner of arranging the socket, and ball as to allow the instrument to be used as a quadrant.

FRANCIS WHITELEY.

Test:
ABSALOM HAND,
JAMES TURNER.